US009273736B2

(12) United States Patent
Rothvoss et al.

(10) Patent No.: US 9,273,736 B2
(45) Date of Patent: Mar. 1, 2016

(54) DRIVETRAIN-CLUTCH ARRANGEMENT AND FLUID CYLINDER THEREFOR

(71) Applicant: GETRAG Getriebe-und Zahnradfabrik Hermann Hagenmeyer GmbH & Cie KG, Untergruppenbach (DE)

(72) Inventors: Stefan Rothvoss, Steinheim (DE); Guenter Ruehle, Loechgau (DE); Hansi Gremplini, Ingersheim (DE)

(73) Assignee: GETRAG GETRIEBE—UND ZAHNRADFABRIK HERMANN HAGENMEYER GMBH & CIE KG, Untergruppenbach (DE)

( * ) Notice: Subject to any disclaimer, the term of this patent is extended or adjusted under 35 U.S.C. 154(b) by 226 days.

(21) Appl. No.: 13/754,692

(22) Filed: Jan. 30, 2013

(65) Prior Publication Data
US 2013/0192948 A1   Aug. 1, 2013

(30) Foreign Application Priority Data
Jan. 31, 2012  (DE) .................... 10 2012 002 162

(51) Int. Cl.
| F16D 25/062 | (2006.01) |
| F15B 15/14 | (2006.01) |
| F15B 15/22 | (2006.01) |
| F16D 25/063 | (2006.01) |
| F16D 48/02 | (2006.01) |

(52) U.S. Cl.
CPC .......... *F16D 25/062* (2013.01); *F15B 15/1423* (2013.01); *F15B 15/1447* (2013.01); *F15B 15/224* (2013.01); *F16D 25/063* (2013.01); *F16D 48/02* (2013.01); *F16D 2048/0212* (2013.01); *F16D 2048/0248* (2013.01); *F16D 2048/0263* (2013.01); *F16D 2300/08* (2013.01)

(58) Field of Classification Search
CPC . F16D 25/0638; F16D 25/12; F16D 2125/08; F16D 2125/16
USPC .......... 192/85.38, 85.41, 85.44, 85.58, 109 F; 91/27; 92/165 R
See application file for complete search history.

(56) References Cited

U.S. PATENT DOCUMENTS

| 4,242,946 A * | 1/1981 | Toliusis ........................... 92/59 |
| 4,577,741 A * | 3/1986 | Schmid ...................... 192/85.15 |
| 2005/0056145 A1 | 3/2005 | Schnapp et al. |
| 2008/0006114 A1 | 1/2008 | Reul et al. |
| 2009/0038908 A1* | 2/2009 | Quehenberger et al. .... 192/85 R |

FOREIGN PATENT DOCUMENTS

| DE | 101 22 652 A1 | 12/2002 |
| DE | 102 15 874 A1 | 11/2003 |

(Continued)

*Primary Examiner* — Colby M Hansen
(74) *Attorney, Agent, or Firm* — Knobbe Martens Olson & Bear LLP

(57) ABSTRACT

Fluid cylinder for activating an element of a drivetrain of a motor vehicle. The fluid cylinder has a cylinder housing and a piston. The piston is sealed off from the cylinder housing by means of a piston seal. At least one fluid chamber is formed between the cylinder housing and the piston, which fluid chamber can be connected via at least a first fluid connection to a fluid supply device. The piston in a piston stop position rests against a stop surface of the cylinder housing. The first fluid connection is formed in the region of the stop surface of the cylinder housing. The piston is connected to a sealing device which seals off the first fluid connection in the piston stop position.

11 Claims, 2 Drawing Sheets

(56) References Cited

FOREIGN PATENT DOCUMENTS

| DE | 10 2006 030 450 A1 | 1/2008 |
| EP | 1 041 293 A2 | 10/2000 |
| JP | 2004332778 A | 11/2004 |

* cited by examiner

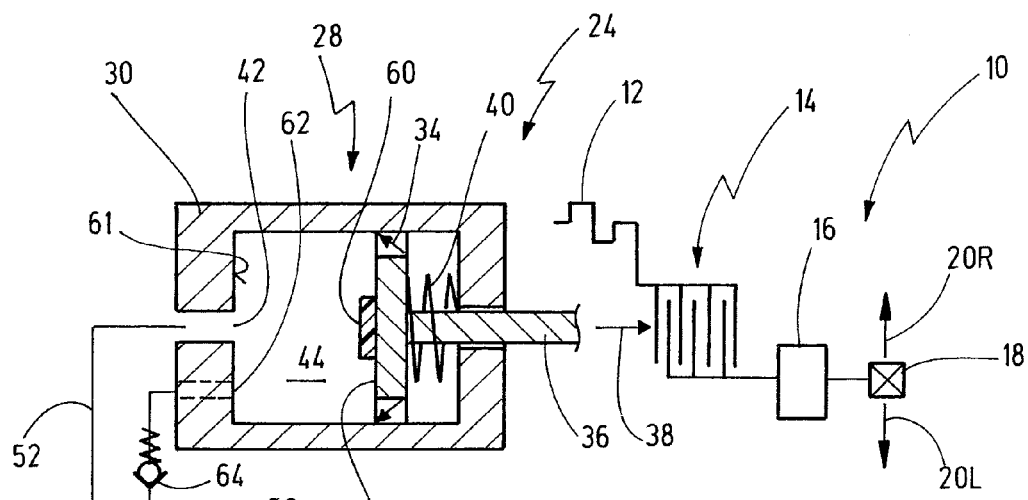
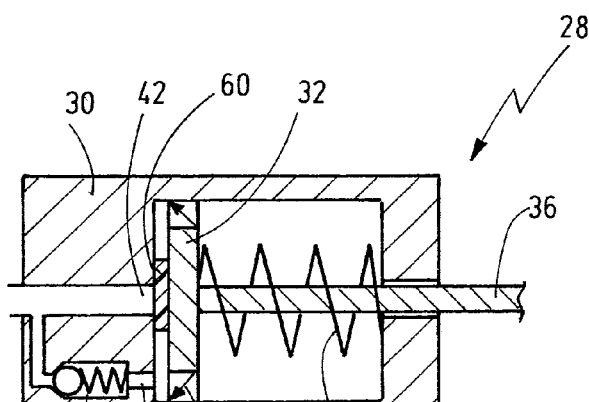
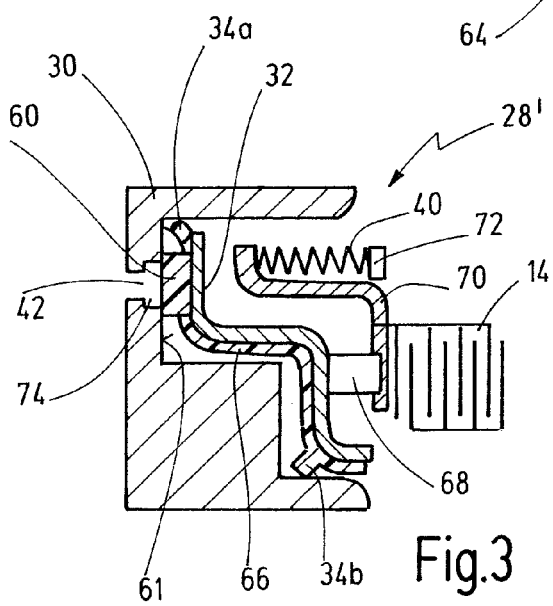
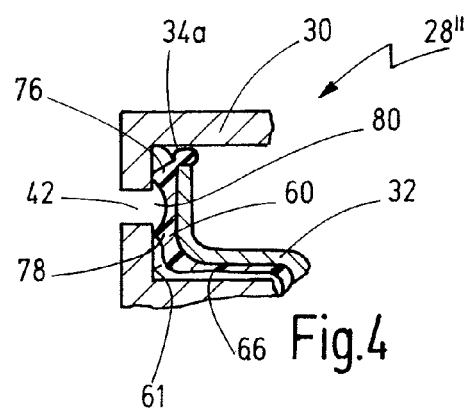
Fig.1
Fig.2
Fig.3
Fig.4

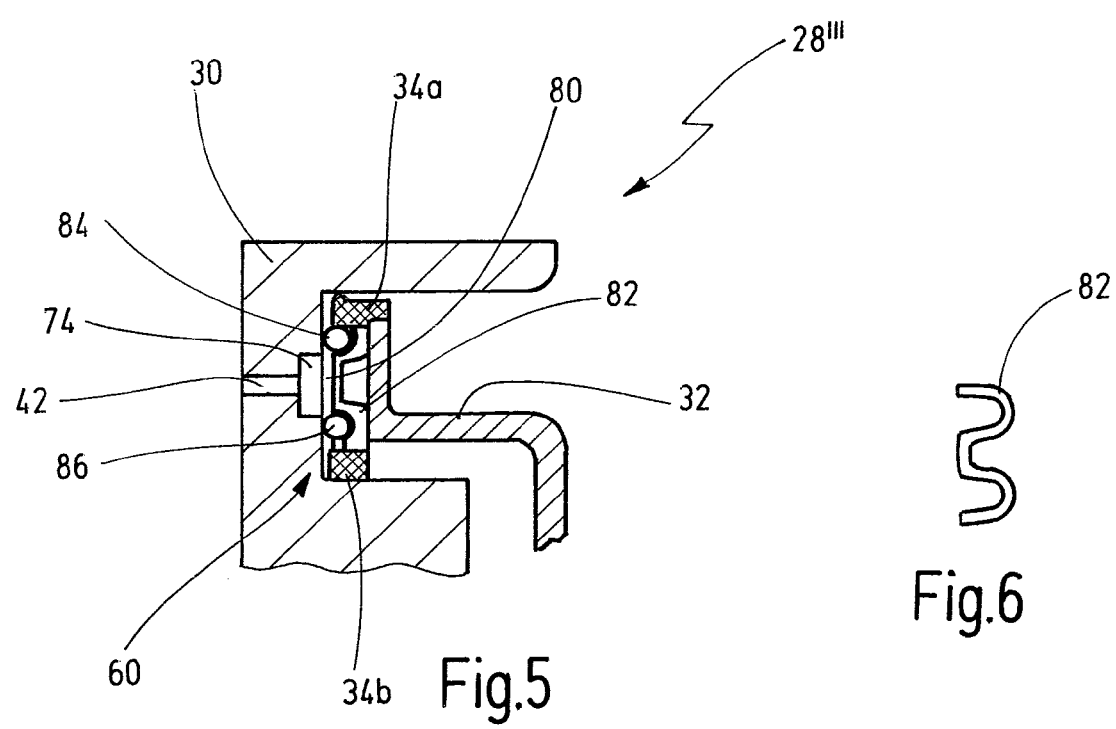

DRIVETRAIN-CLUTCH ARRANGEMENT AND FLUID CYLINDER THEREFOR

CROSS-REFERENCE TO RELATED APPLICATIONS

This application claims the priority of German patent application DE 10 2012 002 162.3, filed Jan. 31, 2012.

BACKGROUND OF THE INVENTION

Field of the Invention

The present invention relates to a cylinder for activating or actuating an element of a drivetrain of a motor vehicle, having a cylinder housing and a piston, wherein the piston is sealed off from the cylinder housing by means of a piston seal, wherein at least one fluid chamber is formed between the cylinder housing and the piston, which fluid chamber can be connected via at least a first fluid connection to a fluid supply device and wherein the piston in a piston stop position rests against the stop surface of the cylinder housing.

The present invention furthermore relates to an actuator arrangement for a drivetrain, with a fluid supply device and such a fluid cylinder. The present invention finally also relates to a drivetrain-clutch arrangement with a friction clutch and with such an actuator arrangement for automated activation of the friction clutch.

In the field of drivetrains for motor vehicles, it is known to activate friction clutches by means of fluid, in particular hydraulically. Such hydraulic actuator arrangements are used in particular in automated drivetrains, for example, automated shift transmissions, double-clutch transmissions, converter automatic transmissions, etc.

A fluid supply device for connection to a hydraulic cylinder for activating a friction clutch generally contains a pump which sucks fluid out of a tank. On the pressure side of the pump, a pressure control valve is generally provided in order to produce a constant line pressure. In this case, the pump is generally coupled directly to an internal combustion engine. A suitable pressure for the hydraulic cylinder is then set from the line pressure by further pressure control valves which are actuated electromagnetically.

Hydraulic cylinders which are used to activate friction clutches are often formed as single-acting hydraulic cylinders, wherein the activation piston is pressed by means of a spring arrangement into a base position in which the piston rests against a stop surface of the cylinder housing (piston stop position or end position of the piston).

In this case, the piston is sealed off from the cylinder cylinder housing generally by means of a single-acting seal.

SUMMARY OF THE INVENTION

Against the above background, one object of the invention is to indicate an improved fluid cylinder, an improved actuator arrangement and an improved drivetrain-clutch arrangement.

The above object is achieved in the case of the above-mentioned fluid cylinder in that the first fluid connection is formed in the region of the stop surface of the cylinder housing, wherein the piston is connected to a sealing device which seals off the first fluid connection in the piston stop position.

The above object is furthermore achieved by an actuator arrangement with such a fluid cylinder and by a drivetrain-clutch arrangement with such an actuator arrangement.

The fluid cylinder according to the invention is particularly suitable for use with fluid supply devices which also enable pumping of fluid away from the fluid chamber. As a result of this, the movement of the piston in the direction of the piston stop position can be supported. If such a fluid supply device is used, there is the risk that air is sucked in via the piston seal and namely out of the region of the cylinder housing in which e.g. a spring arrangement is arranged and which is generally depressurized. The air sucked into the fluid system as a result of this can lead to set characteristic curves for actuating the friction clutch being distorted such that malfunctions in activating the friction clutch occur and the dynamics of the activation deteriorate.

This problem could be remedied in that the piston seal is formed so as to seal in both directions (dual-acting seal). As a result of this, however, a higher degree of friction is produced and thus a greater hysteresis which makes it more difficult to actuate the friction clutch.

As a result of the measure according to the invention of connecting the piston to a sealing device which seals off the first fluid connection in the piston stop position, the fluid cylinder is sealed off from a vacuum. As a result, the piston seal can also be formed as a single-acting seal so that the piston can be moved with lower friction relative to the cylinder housing.

In the case of the fluid cylinder according to the invention, the first fluid connection can be cut off as a result before the fluid chamber is fully emptied when creating a suction pressure.

As a result, the intake of air can be prevented. An emptying of the lines with an unpressurized piston is furthermore prevented by the sealing element.

Due to the fact that a vacuum could only form in the fluid chamber when the piston is in the piston stop position (until then the piston is also moved with the sucking of the fluid out of the fluid chamber), the piston stop position can be used to seal off the fluid chamber.

The object is thus fully achieved.

Since no vacuum can be generated in the fluid chamber itself when creating a suction pressure and as a result an intake of air via the piston seal is substantially ruled out, it is preferable to form the piston seal as a single-acting seal which seals off the piston from the cylinder housing when the fluid chamber is filled with pressurized fluid.

It is furthermore possible that the fluid cylinder is formed as a dual-acting cylinder.

It is, however, particularly preferable if the fluid cylinder is formed as a single-acting cylinder, wherein the piston is pretensioned into the piston stop position by means of a spring arrangement.

In the case of this embodiment, the sucking of fluid out of the fluid chamber only serves to support the spring arrangement if, for example, a friction clutch must be opened quickly or the like.

Since the cross-sectional surface of the first fluid connection sealed off by means of the sealing device is generally smaller than the surface of the piston, it may be necessary to initially apply a higher pressure in order to move the piston out of the piston stop position.

According to one particularly preferred embodiment, the fluid chamber can therefore be connected via at least a second fluid connection to the fluid supply device, wherein a non-return valve is arranged between the second fluid connection and the supply device.

In the case of this embodiment, the non-return valve can also be opened in the case of a relatively small spring pretensioning with a relatively low pressure, wherein the second fluid connection is then preferably connected to the fluid chamber in such a manner that the fluid entering via the second fluid connection acts thereon across a relatively large surface of the piston. As a result of this, the pressure required to lift the piston out of the piston stop position can be reduced.

According to a further preferred embodiment, the fluid chamber is connected via a plurality of first fluid connections to the fluid supply device, wherein the sealing device in the piston stop position seals off the first fluid connections.

Such a configuration can be provided in the case of a normal, cylindrically formed fluid cylinder. This embodiment is, however, particularly preferable if the piston is formed as an annular piston, wherein the first fluid connections are arranged distributed in the circumferential direction.

Such an annular piston can be particularly effectively used in order to activate friction clutches which are arranged coaxially about a shaft as is the case, for example, in the case of automated shift transmissions of double-clutch transmissions.

The sealing device can in this case also be formed as an annular element which simultaneously seals off all the first fluid connections when the piston stop position is reached.

In order in turn to prevent a relatively high pressure being required for detaching the piston from the piston stop position, it is preferable if the cylinder housing and/or the sealing device has a channel for connecting at least two of the fluid connections.

As a result of such a channel, the active surface for moving the piston out of the piston stop position can be substantially determined by the cross-sectional surface of the channel which, as a result of the connection of the at least two, in particular all the first fluid connections is formed to be substantially larger than the sum of the cross sections of the first fluid connections.

A channel in the sealing device can be installed, for example, by two sealing webs or lips which project axially from the piston surface, of which one lies radially on the outside and the other radially on the inside. The active cross-sectional surface is then the annular surface between the radially outer and the radially inner sealing web.

In order to form such a channel in the cylinder housing, an annular groove can be made in the cylinder housing in the region of the stop surface.

It is particularly preferable if the piston is connected to a sealing ring receptacle in which at least one sealing ring is inserted which seals off the at least one first fluid connection in the piston stop position.

The sealing ring can, for example, be an O-ring.

In the case of one embodiment, the sealing ring receptacle can receive a radially inner and a radially outer sealing ring, between which a channel for connecting at least two of the fluid connections can be formed.

Such an embodiment can be produced in a particularly cost-effective manner.

It is furthermore generally preferable if the sealing device is formed as a stop damping element.

As a result of this, noises of the fluid cylinder can be prevented or reduced during stopping of the piston in the piston stop position.

In the case of the actuator arrangement according to the invention, it is particularly preferable if the fluid supply device has a bidirectional pump which has a first pump connection, which is connected to the fluid connection of the fluid cylinder, and which has a second pump connection, which is connected to a low-pressure portion, wherein the pump can be driven in such a manner that fluid is sucked out of the fluid chamber in order to support a movement of the piston in the direction of the piston stop position. The reverse running of the pump can furthermore be advantageous in order to enable a further function, for example, activating a parking lock.

In the case of such a fluid supply device, the first pump connection is preferably connected directly to the first fluid connection without interconnection of a pressure control valve. In this case, the pressure in the fluid cylinder is set by the rotational speed of the pump which is preferably driven by means of an electric motor which can be actuated in a regulated manner.

In order to improve the capacity for regulation, the first pump connection can furthermore be connected via a orifice or a diaphragm to the low-pressure portion.

The sealing device can be sprayed or vulcanized directly onto the piston in all the embodiments.

It will be obvious that the above-mentioned features and the features which have still to be explained below can not only be used in the respectively indicated combination but also in other combinations or alone without departing from the scope of the present invention.

BRIEF DESCRIPTION OF THE DRAWINGS

Exemplary embodiments of the invention are shown in the drawing and are explained in greater detail in the following description. In this drawing:

FIG. 1 shows a schematic representation of a drivetrain of a motor vehicle with a clutch arrangement which is activated by means of an actuator arrangement which has a fluid cylinder according to the invention;

FIG. 2 shows the fluid cylinder of FIG. 1 with the piston in the piston stop position and with a modified second fluid connection;

FIG. 3 shows a schematic representation of a fluid cylinder with an annular piston;

FIG. 4 shows a modification of the fluid cylinder of FIG. 3 with a sealing device which has two radially spaced apart sealing webs;

FIG. 5 shows a production variant of the embodiment of FIG. 4 with two sealing rings; and FIG. 6 shows a longitudinal section of a sealing ring receptacle of the fluid cylinder of FIG. 5.

DETAILED DESCRIPTION OF THE PREFERRED EMBODIMENT

In FIG. 1, a drivetrain for a motor vehicle is represented schematically and is generally designated by 10. Drivetrain 10 has a drive engine 12 such as an internal combustion engine and a clutch arrangement 14 connected thereto which can be formed, for example, as a starting clutch. Clutch arrangement 14 is formed in the present case as single friction clutch, but could also contain two clutches for a double-clutch transmission. Drivetrain 10 furthermore contains a transmission 16 such as a single step-by-step variable transmission or a double-clutch transmission. An output of transmission 16 is connected to a differential 18 which distributes drive power to two driven wheels 20L, 20R of the motor vehicle.

An actuator arrangement 24 is provided for activating clutch arrangement 14. Actuator arrangement 24 is formed as a fluid actuator arrangement and has a fluid supply device 26. A fluid cylinder 28 is connected to fluid supply device 26. Fluid cylinder 28 has a cylinder housing 30 within which a piston 32 is mounted axially displaceably. A piston seal 34 is formed between piston 32 and cylinder housing 30, which piston seal 34 is formed as a single-acting seal. A piston rod 36 is connected to the piston 32 and exits from cylinder housing 30. Piston rod 36 acts via a suitable activating device, not represented in greater detail, on clutch arrangement 14. An activation force generated by fluid cylinder 28 for activating friction clutch 14, which can be formed, for example, as a wet-running disc clutch or as a dry clutch, is shown in the case of 38.

Fluid cylinder 28 is formed as a single-acting cylinder, wherein a spring arrangement 40 is arranged in cylinder housing 30 which pretensions piston 32 counter to the direction of activation force 38.

Cylinder housing 30 furthermore has a first fluid connection 42 which is formed in the region of an axial end surface of a fluid chamber 44 which is formed between piston 32 and cylinder housing 30.

In FIG. 1, piston 32 is deflected counter to the force of spring arrangement 40. For this purpose, a fluid such as an hydraulic oil has been supplied via first fluid connection 42 into fluid chamber 44 under pressure.

Fluid supply device 26 serves to supply the fluid, which fluid supply device 26 has a bidirectional pump 46. Bidirectional pump 46 is driven by means of an electric motor 48 and has a first pump connection 50. First pump connection 50 is connected via a direct connection line 52 without interconnection of a pressure control valve to first fluid connection 42. Pump 46 furthermore has a second pump connection 54 which is connected to a low-pressure portion 56 in the form of a tank. First pump connection 50 is furthermore connected via a cover plate or an orifice or a diaphragm 58 to low-pressure portion 56.

For filling of fluid chamber 44, pump 46 is driven in such a manner that fluid is sucked out of low-pressure portion 56, and indeed via second pump connection 54. The fluid conducted in this manner is supplied via connection line 52 to first fluid connection 42. The pressure of the fluid in fluid chamber 44 can be set in this case by regulating the rotational speed of electric motor 48. The bypass with cover plate 58 can in this case lead to an improvement in the regulating properties.

Clutch arrangement 14 is preferably a normally open clutch which is activated in the closing direction during filling of fluid chamber 44.

In some situations, it may be expedient to open the friction clutch very quickly, for example, in the case of a reset of a control system or the like.

It is not only provided for this case that spring arrangement 40 compresses piston 32 into a starting position. In order to achieve a faster opening of the clutch arrangement, pump 46 is driven in the opposite direction of rotation, wherein fluid is sucked out of fluid chamber 44 and is supplied via second pump connection 54 to low-pressure portion 56.

In order to prevent air being sucked in via piston seal 34, piston 32 is connected to a sealing device 60. Sealing device 60 is preferably fixed as an elastically deformable sealing element to the face side of piston 32 facing fluid chamber 44. If piston 28 strikes against a face-side stop surface 61 of cylinder housing 30 as a result of the force of spring arrangement 40 and as a result of the sucking of fluid out of fluid chamber 44 (see FIG. 2), sealing device 60 seals off first fluid connection 42. As a result of this, it is prevented that further fluid is sucked out of fluid chamber 44. As a result, it is prevented that air is sucked in via piston seal 34 acting on one side. Piston seal 34 can therefore be formed as a single-acting seal.

If the piston is supposed to be deflected back out of the piston stop position reached in this manner, wherein engine 48 is thus driven again such that fluid is sucked out of low-pressure portion 56 and is supplied via connection line 52 to first fluid connection 42, the active cross-sectional surface is relatively small, namely corresponding to the cross section of first fluid connection 42. As a result of this, initially a relatively high pressure is required in connection line 52 in order to release piston 32 out of the piston stop position which is also shown by way of example in FIG. 2.

Only when the piston has been released from this position is the active piston surface again the surface of the entire piston so that a lower pressure is required for further deflection of piston 32.

In order to obviate this problem, cylinder housing 30 can have a second fluid connection 62 which avoids the sealing off of first fluid connection 42. Second fluid connection 62 can then be connected via a separate non-return valve 64 to first pump connection 50. As a result of this, from the very start when releasing piston 32 from the piston stop position, a larger cross-sectional surface is available so that the piston can already be lifted from the piston stop position in the case of a lower pressure of the fluid. Non-return valve 64 can in this case be a valve provided outside cylinder housing 30, but can also, as is alternatively shown in FIG. 2, be integrated into cylinder housing 30.

For activation of friction clutches in motor vehicle drivetrains, it is advantageous if the fluid cylinder is formed as an annular cylinder with an annular piston, as is schematically represented in FIG. 3. FIG. 3 shows in this case only a semi-longitudinal section of such an annular fluid cylinder 28'.

In the case of this embodiment, it is furthermore preferable if cylinder housing 30 has a plurality of first fluid connections 42 distributed across the circumference. The piston is correspondingly formed with an annular sealing device 60 which simultaneously seals off all the first fluid connections 42, of which only one is shown in FIG. 3.

Piston seal 34 can be formed by a sealing layer 66 on the side of annular piston 32 facing the fluid chamber, wherein piston seal 34 has a radially outwardly lying sealing lip 34$a$ and a radially inwardly lying sealing lip 34$b$.

It can furthermore be preferable in the case of the use of such a fluid cylinder 28' for activating a clutch arrangement 14 if annular piston 32 is coupled via an axial bearing 68 to an activating element for activating clutch arrangement 14. In this case, annular cylinder 28' can be arranged fixed on the housing. The clutch arrangement has in this case preferably a spring web 70, wherein a spring arrangement 40 is arranged between spring web 70 and a clutch casing 72 which co-rotate with clutch arrangement 14. In a further variant, spring 40 can be supported in cylinder housing 30 and act directly on piston 32.

It is furthermore shown in FIG. 3 that a circumferential annular groove 74 can be formed in the region of stop surface 61 in cylinder housing 30, which annular groove 74 connects the plurality of fluid connections 42 distributed across the circumference to one another. The annular groove forms in this case a channel 74, the cross-sectional surface of which defines the active surface for lifting annular piston 32 out of the piston stop position shown in FIG. 3. This surface is larger than the sum of the cross-sectional surfaces of first fluid connections 42 so that the lifting of annular piston 32 out of the piston stop position is made easier.

FIG. 4 shows an alternative embodiment of a fluid cylinder 28" which can correspond generally to fluid cylinder 28' of FIG. 3 in terms of structure and function.

In the case of this embodiment, a sealing layer 66 on annular piston 32 not only contains a sealing lip 34$a$ (and optionally 34$b$) for formation of a piston seal 34. Rather, sealing layer 66 has an annular first axially projecting sealing web 76 which acts radially outside first fluid connections 42 on stop surface 61. Sealing layer 66 further contains a second sealing web 78 which projects axially and rests against the stop surface radially within the plurality of first fluid connections 42.

In the case of this embodiment, an annular channel 80 is formed between first sealing web 76 and second sealing web 78, which annular channel 80 defines the active cross-sectional surface for lifting the piston out of the piston stop position. In the case of this embodiment, an annular channel 74 in cylinder housing 30 can optionally be omitted.

FIG. 5 shows a further embodiment of a fluid cylinder 28''' which corresponds generally to fluid cylinder 28'' of FIG. 4 in terms of structure and function.

In the case of this embodiment, a sealing ring receptacle 82 is fixed on piston 32, the longitudinal section of which sealing ring receptacle 82 is represented in FIG. 6.

Sealing ring receptacle 82 can be welded, for example, to piston 32. Two sealing rings 84, 86 can be inserted or glued into sealing ring receptacle 82. The sealing rings can be formed as premanufactured O-rings, but can also be injected or vulcanized into the sealing ring receptacle.

Sealing rings 84, 86 have the same function as sealing webs 76, 78. A channel 80 is in turn formed between sealing rings 84, 86, which channel 80 defines the active cross-sectional surface for lifting piston 32 out of the piston stop position.

A first sealing lip 34a can be formed on a radial outer circumference of sealing ring receptacle 82. A further sealing lip 34b can be formed on a radial inner circumference of sealing ring receptacle 82, wherein sealing lips 34a, 34b form the piston seal 34.

As is shown in FIG. 5, the embodiment with channel 80 formed by sealing rings 84, 86 can also be combined with an annular channel 74 in cylinder housing 30.

What is claimed is:

1. Fluid cylinder for activating an element of a drivetrain of a motor vehicle, having a cylinder housing and a piston, wherein the piston is sealed off from the cylinder housing by means of a piston seal, wherein at least one fluid chamber is formed between the cylinder housing and the piston, which fluid chamber can be connected via at least a first fluid connection and a second fluid connection to a fluid supply device and wherein the piston in a piston stop position rests against a stop surface of the cylinder housing,
wherein the first fluid connection is formed in a region of the stop surface of the cylinder housing, wherein the piston is connected to a sealing device which seals off the first fluid connection from the fluid chamber in the piston stop position,
wherein the piston is biased into the piston stop position by means of a spring arrangement,
wherein a non-return valve is arranged between the second fluid connection and the fluid supply device, so that a pressure required to lift the piston out of the piston stop position can be reduced.

2. Fluid cylinder according to claim 1, wherein the piston seal is formed as a single-acting seal which seals off the piston from the cylinder housing when the fluid chamber is filled with pressurized fluid.

3. Fluid cylinder according to claim 1, wherein the fluid cylinder is formed as a single-acting cylinder.

4. Fluid cylinder according to claim 1, wherein the fluid chamber is connected via a plurality of first fluid connections to the fluid supply device, wherein the sealing device in the piston stop position seals off the first fluid connections.

5. Fluid cylinder according to claim 4, wherein the piston is formed as an annular piston, wherein the first fluid connections are arranged distributed in the circumferential direction.

6. Fluid cylinder according to claim 4, wherein at least one of the cylinder housing and the sealing device has a channel for connecting at least two of the fluid connections.

7. Fluid cylinder according to claim 1, wherein the piston is connected to a sealing ring receptacle in which at least one sealing ring is inserted which seals off the at least one first fluid connection in the piston stop position.

8. Fluid cylinder according to claim 1, wherein the sealing device is formed as a stop damping element.

9. Actuator arrangement for a drivetrain of a motor vehicle, with a fluid supply device and a fluid cylinder for activating an element of the drivetrain, the fluid cylinder having a cylinder housing and a piston, wherein the piston is sealed off from the cylinder housing by means of a piston seal, wherein at least one fluid chamber is formed between the cylinder housing and the piston, which fluid chamber can be connected via at least a first fluid connection and a second fluid connection to the fluid supply device and wherein the piston in a piston stop position rests against a stop surface of the cylinder housing,
wherein the first fluid connection is formed in a region of the stop surface of the cylinder housing, wherein the piston is connected to a sealing device which seals off the first fluid connection from the fluid chamber in the piston stop position,
wherein the piston is biased into the piston stop position by means of a spring arrangement, and
wherein a non-return valve is arranged between the second fluid connection and the fluid supply device, so that a pressure required to lift the piston out of the piston stop position can be reduced.

10. Actuator arrangement according to claim 9, wherein the fluid supply device has a bidirectional pump which has a first pump connection, which is connected to the fluid connection of the fluid cylinder, and which has a second pump connection, which is connected to a low-pressure portion, wherein the pump can be driven in such a manner that fluid is sucked out of the fluid chamber in order to support a movement of the piston in the direction of the piston stop position.

11. Drivetrain-clutch arrangement with a friction clutch and with an actuator arrangement for automated activation of the friction clutch, the actuator arrangement comprising a fluid supply device and a fluid cylinder for activating the friction clutch, the fluid cylinder having a cylinder housing and a piston, wherein the piston is sealed off from the cylinder housing by means of a piston seal, wherein at least one fluid chamber is formed between the cylinder housing and the piston, which fluid chamber can be connected via at least a first fluid connection and a second fluid connection to the fluid supply device and wherein the piston in a piston stop position rests against a stop surface of the cylinder housing,
wherein the first fluid connection is formed in a region of the stop surface of the cylinder housing, wherein the piston is connected to a sealing device which seals off the first fluid connection from the fluid chamber in the piston stop position,
wherein the piston is biased into the piston stop position by means of a spring arrangement, and
wherein a non-return valve is arranged between the second fluid connection and the fluid supply device, so that a pressure required to lift the piston out of the piston stop position can be reduced.

* * * * *